United States Patent [19]

Dustman

[11] 4,386,914
[45] Jun. 7, 1983

[54] TRANSMITTER EXTENSION APPARATUS FOR MANIPULATING MODEL VEHICLES

[76] Inventor: Larry L. Dustman, 1706 E. Indian School Rd., Phoenix, Ariz. 85016

[21] Appl. No.: 254,405

[22] Filed: Apr. 15, 1981

[51] Int. Cl.³ .................... G09B 9/08; A63H 30/04
[52] U.S. Cl. .................................. 434/32; 46/76 R; 74/471 XY; 244/190
[58] Field of Search .................. 434/32; 46/1 H, 1 R, 46/76 R, 78; 272/1 C, 31 A; 244/190, 3.14; 74/471 XY

[56] References Cited

U.S. PATENT DOCUMENTS

| | | | |
|---|---|---|---|
| 2,863,619 | 12/1958 | Servanty | 244/3.14 |
| 3,373,957 | 3/1968 | Budde | 46/76 R X |
| 3,942,148 | 3/1976 | Wishioka | 74/471 XY X |
| 4,093,953 | 6/1978 | Hammons et al. | 74/471 XY X |

OTHER PUBLICATIONS

*The World of Model Aircraft*, by Guy R. Williams, Andre Deutsch in association with Rainbird Reference Books ©1973.
The World of Model Aircraft by Guy R. Williams published by G. P. Putnam's Sons of New York, pp. 178, 179 and title page.

*Primary Examiner*—William H. Grieb
*Attorney, Agent, or Firm*—Warren F. B. Lindsley

[57] ABSTRACT

An apparatus for controlling the control members of a transmitter used for sending radio signals to a receiver in a model airplane which emulates the actions of a pilot in a cockpit on board an aircraft.

4 Claims, 16 Drawing Figures

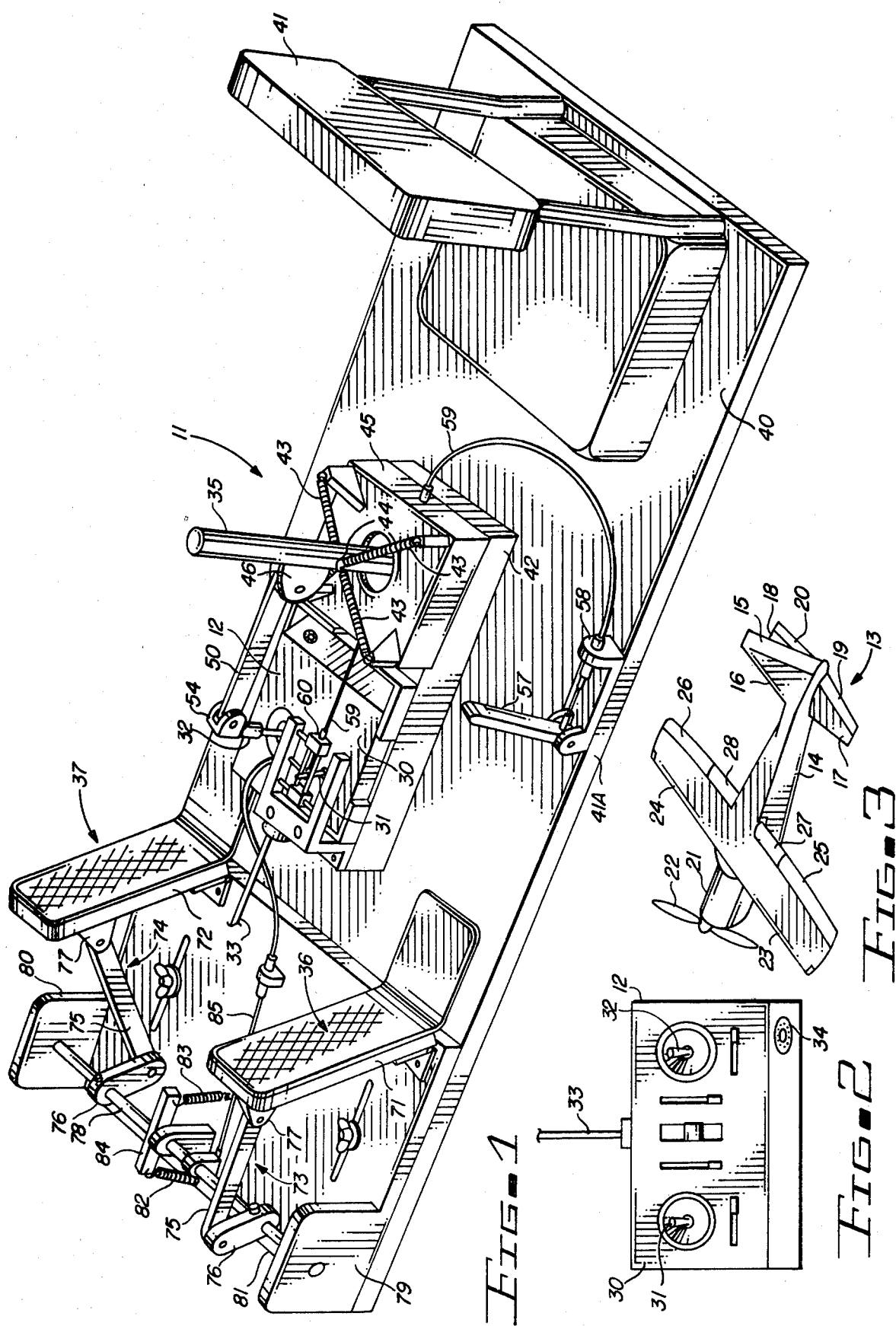

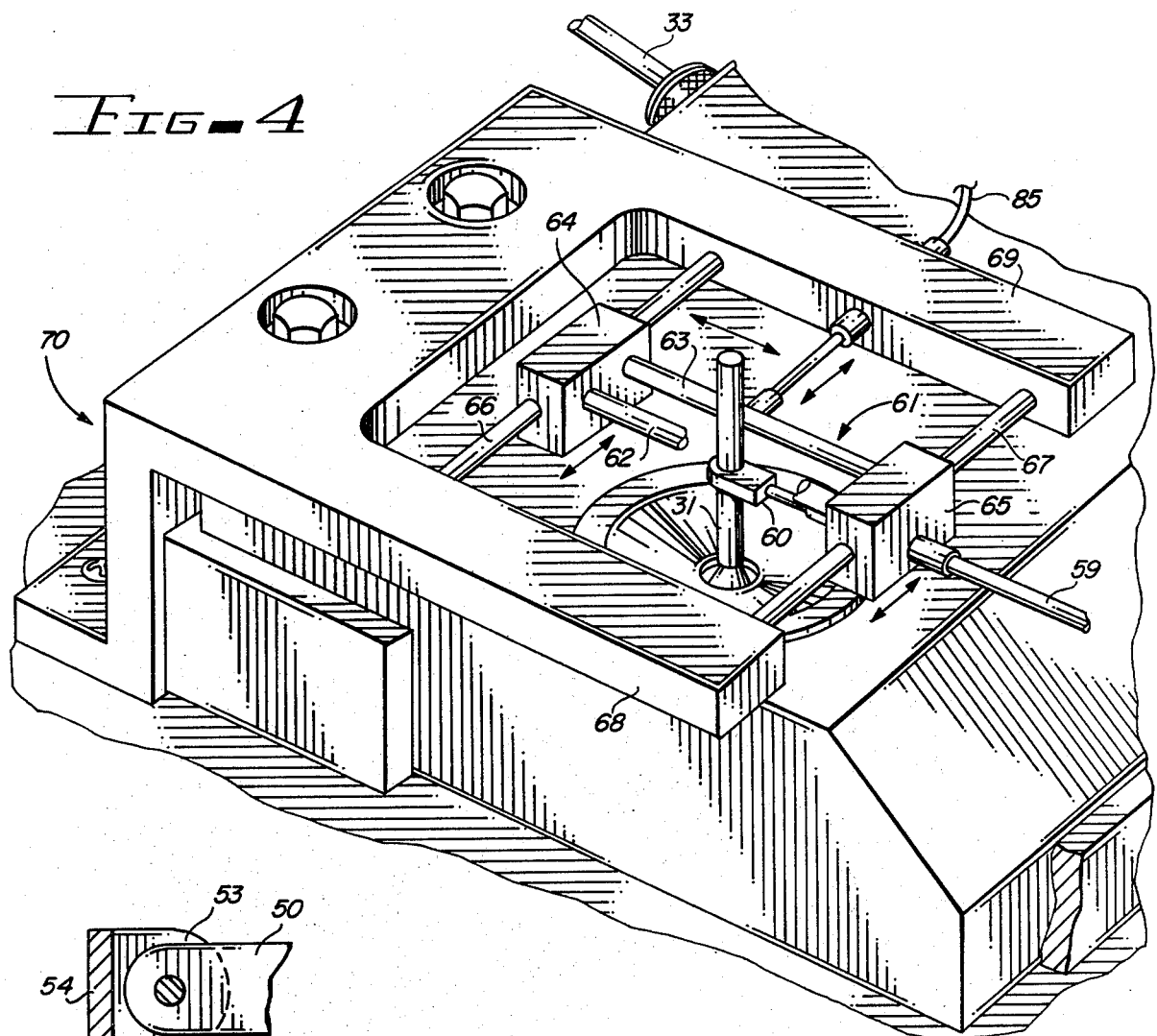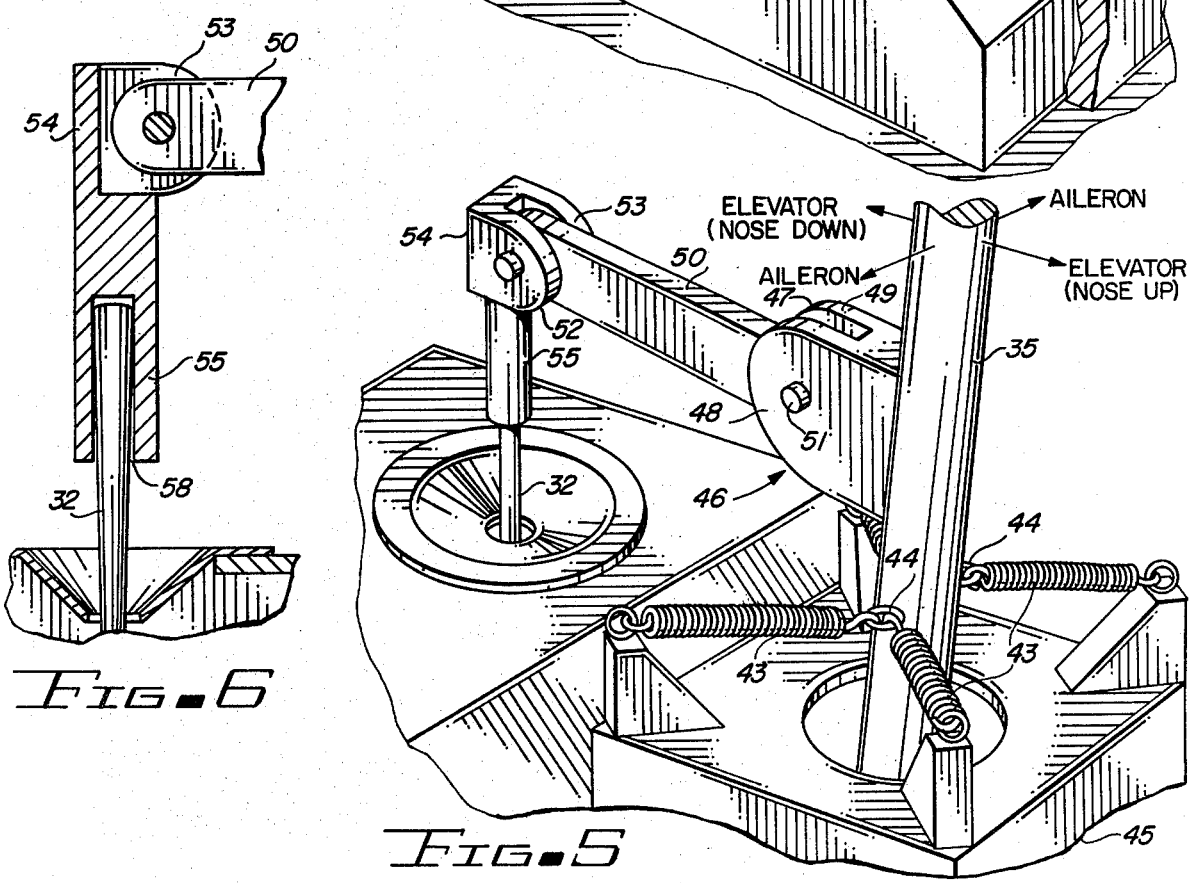

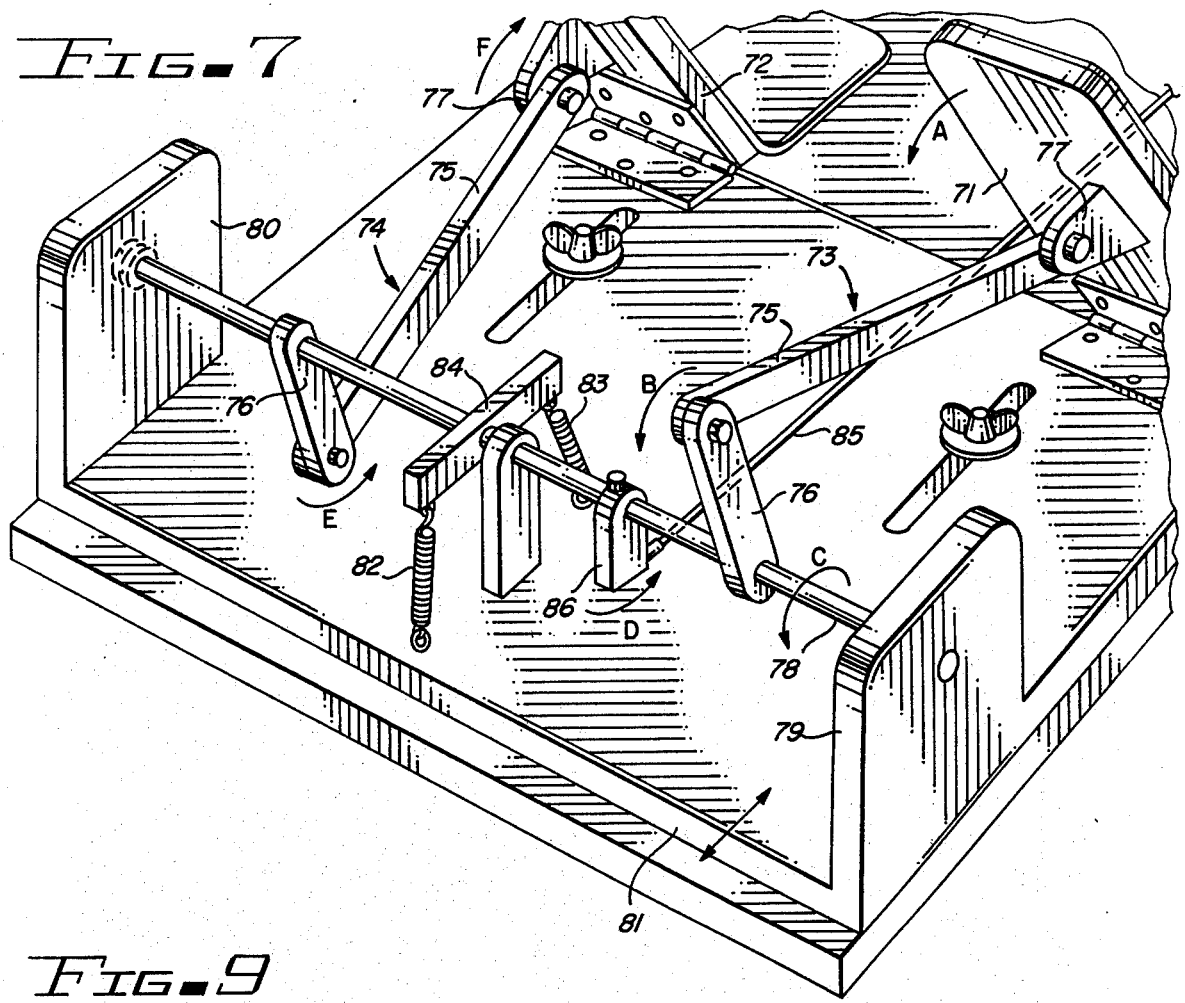
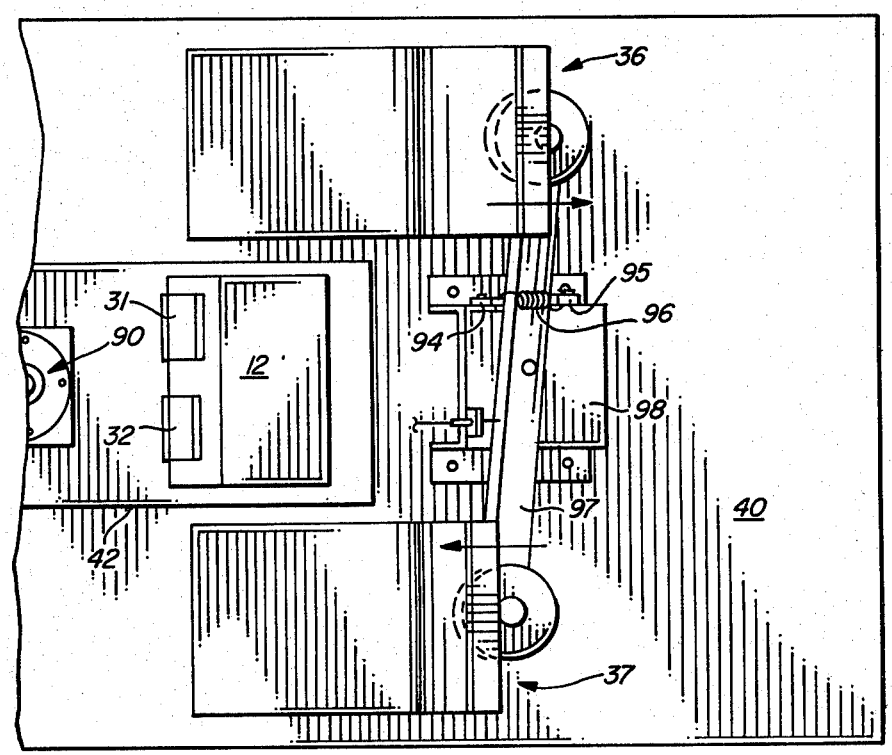

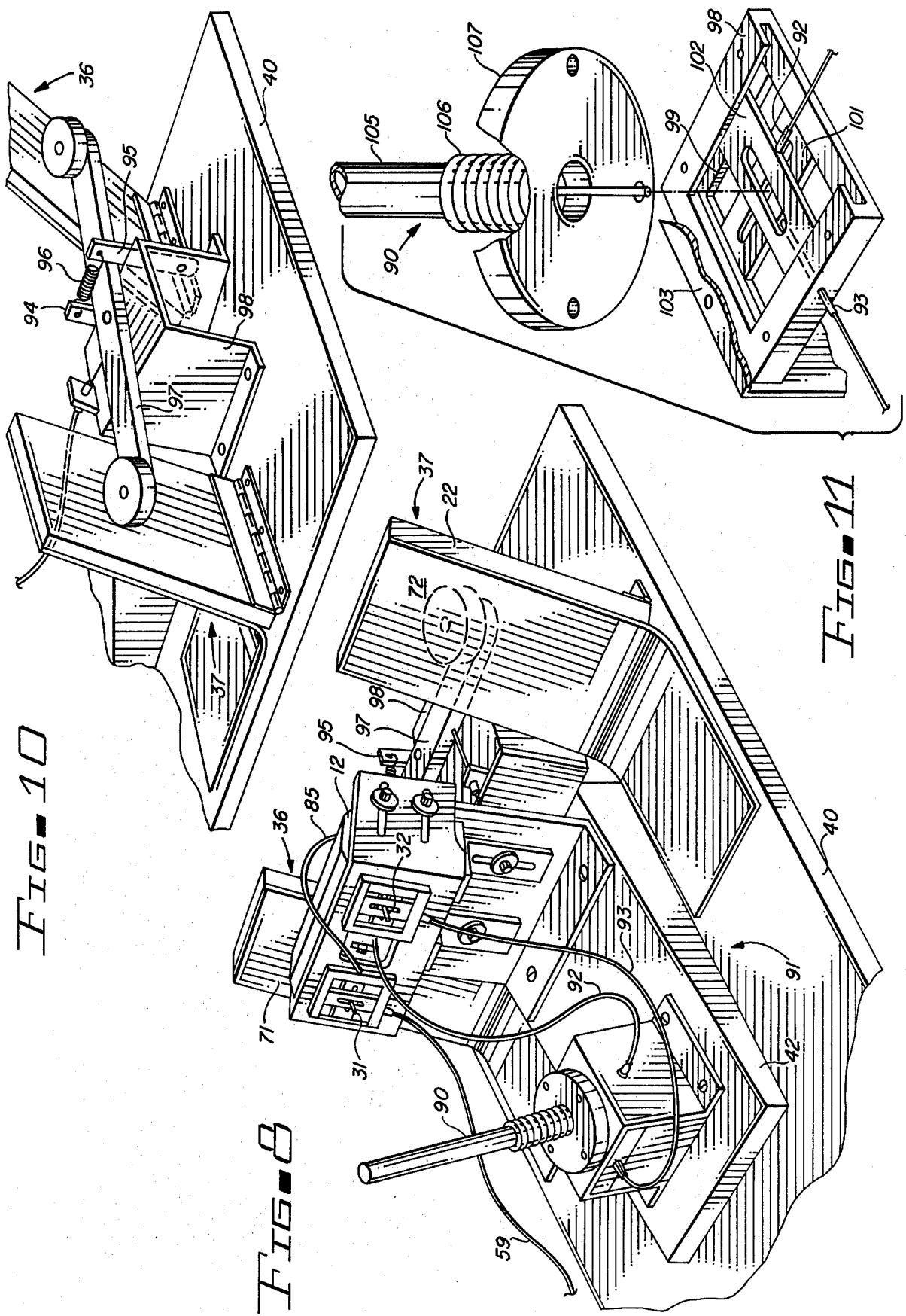

TRANSMITTER EXTENSION APPARATUS FOR MANIPULATING MODEL VEHICLES

BACKGROUND OF THE INVENTION

This invention relates to control mechanisms for model vehicles and more particularly to apparatus for controlling the operation of the transmitters used for radio control of model aircraft.

Most owners and operators of model airplanes utilizing a transmitter for manipulation thereof try to emulate the actions of a pilot in flight. This is difficult to accomplish if the operator of the model airplane does so by holding the transmitter in his hands and manipulates the movement of the model plane by adjusting the controls of the transmitter.

Thus, a need for apparatus which will manipulate transmitters of radio controlled model airplanes which enable the operator to emulate a pilot on board an aircraft. The claimed apparatus can convert a normally hand-held transmitter of radio control signals into a ground based cockpit for operation of airborne model aircraft. With the high costs of operating private aircraft, more pilots are operating model airplanes to keep exercising their flying skills.

DESCRIPTION OF THE PRIOR ART

Present day apparatus employing a transmitter for sending radio signals to a receiver in a model airplane for controlling its movements during ground and flight activities have been hand-held or pedestal mounted. The book entitled, *The World of Model Aircraft* by Guy R. Williams published by G. P. Putnam's Sons of New York discloses on page 179 a Fly Seat made to resemble a pilot seat of a full size airplane. This elaborate and costly seat configuration controlled and synchronized the activities of the aircraft by use of a pivoting boom.

SUMMARY OF THE INVENTION

In accordance with the invention claimed, a new, novel and relatively inexpensive extension is provided for transmitters used for radio control of model vehicles.

It is, therefore, one object of this invention to provide a new and improved simple and easily operated apparatus for manipulating a transmitter used in controlling model aircraft in a manner emulating many actions of an on board pilot.

Another object of this invention is to provide a new and improved platform mounted apparatus for operating a transmitter used in radio controlling model aircraft which forms a cockpit like configuration.

A further object of this invention is to provide an extension for transmitters of radio controlled model aircraft which substantially reduces lost motion between moving parts of the equipment.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described with reference to the accompanying drawings in which:

FIG. 1 is a perspective view of a transmitter for model aircraft controlled by extension apparatus embodying the claimed invention;

FIG. 2 is a top view of the transmitter shown in FIG. 1;

FIG. 3 is a perspective view of a model aircraft;

FIG. 4 is an enlarged partial perspective view of FIG. 1 illustrating the portion of the extension apparatus which controls the rudder of a model airplane;

FIG. 5 is an enlarged partial perspective view of FIG. 1 illustrating that portion of the extension apparatus, i.e. "stick", which controls, inter alia, the aileron and elevator cables of model airplane;

FIG. 6 is an enlarged view partially in cross-section of the arm of the extension apparatus which engages the control lever of the transmitter which controls the aileron and elevator cables of a model airplane;

FIG. 7 is an enlarged partial perspective view of the extension apparatus shown in FIG. 1 illustrating the rudder control of a model airplane;

FIG. 8 is a partial perspective view of a modification of the extension apparatus shown in FIG. 1;

FIG. 9 is a partial top view of the structure shown in FIG. 8;

FIG. 10 is a partial perspective rear view of the structure shown in FIG. 8;

FIG. 11 is an exploded partial view of the control stick mechanism shown in FIG. 8;

DESCRIPTION OF THE PREFERRED EMBODIMENT

Figure 12:
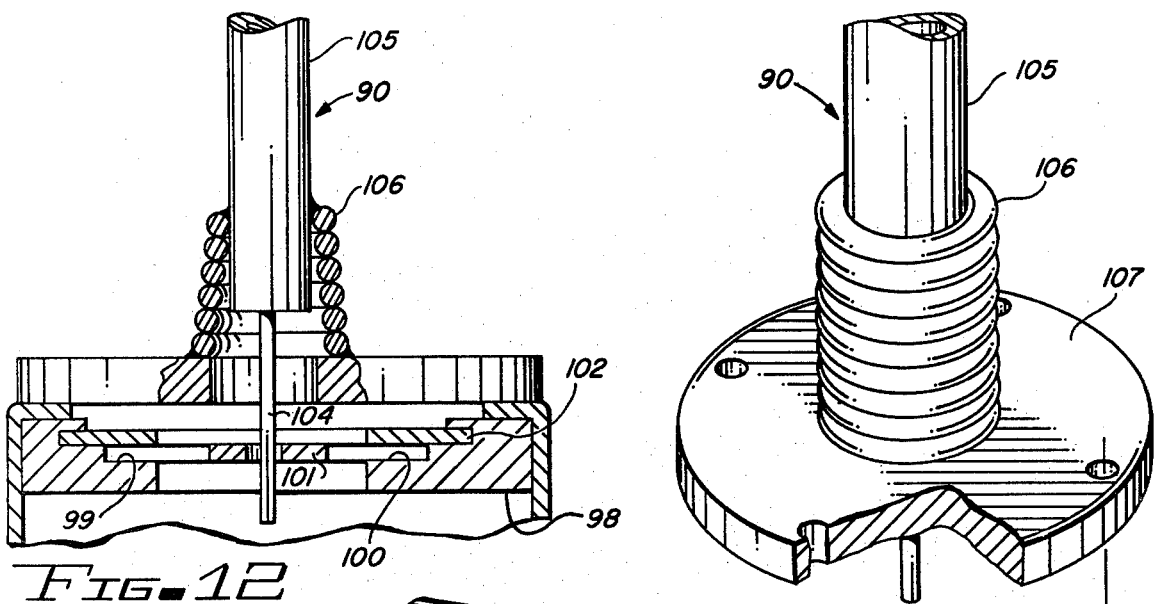
FIG. 12 is a cross-sectional view of the control stick shown in FIGS. 8 and 11.

Referring more particularly to the drawings by characters of reference, FIG. 1 discloses an extension apparatus 11 for controlling model vehicles through radio signals transmitted to receivers in the vehicles by a ground based hand controlled transmitter 12. It should be noted that the term vehicles is intended to mean all forms of model aircraft, as well as model cars, trucks and boats. The term aircraft is intended to be a generic description of all forms of flying devices.

For purposes of description, the inventive concept will be described in functional relationship with a model airplane, such as model airplane 13 shown in FIG. 3.

The model airplane 13 is shown as comprising a fuselage 14 having a rudder 15, vertical stabilizer 16, left and right horizontal stabilizers 17 and 18 and left and right elevators 19 and 20 forming a part of its tail section. A suitable engine (not shown) is mounted at the other end of the fuselage and covered by an engine cowling 21. A suitable propeller 22 is attached to the engine drive shaft for powering the airplane. Model airplane 13 is shown in FIG. 3 with left and right wing portions 23 and 24 and the associated aileron 25 and 26 and wing flaps 27 and 28. Suitable landing gear (not shown) comprises a part of each aircraft.

All free flying model airplanes are controlled by radio signals transmitted by a suitable transmitter and received on board the aircraft by a suitable receiver (not shown).

The transmitter 12 shown in FIG. 1 comprises a front or top panel 30 having a number of controls extending therefrom, the adjustment of which manipulates the various parts of the aircraft during take off, landing and the various maneuvers used in flying the aircraft. Although transmitters may vary between different manufacturers and even between different models of the same manufacturer, all have some similar controls for operating model aircraft.

As shown in FIGS. 1 and 2, transmitter 11 provides engine, rudder, aileron, throttle and elevator control by means of shafts or sticks 31 and 32 operable as hereinafter explained. An antenna 33 is suitably mounted on the outside of the housing of transmitter 12 for broadcasting control signals to the receiver of the model airplane in a well known manner.

A transfer of signals between transmitter 12 and another transmitter of a trainer (not shown) is possible through socket 34 of transmitter 12.

AIRCRAFT CONTROL

The primary job of a pilot, whether airborne or operating a free flying model airplane, is to control and maneuver the airplane, i.e., to direct its flight pattern. The direction and speed of an airplane traveling through the air are determined by the forces acting upon the airplane. To use these forces efficiently, the pilot must understand them thoroughly.

Except for the forces produced by the controls of the transmitter used in controlling model airplanes, there are four forces acting on an airplane in flight, i.e., lift, gravity (weight), thrust and drag. The direction, speed and altitude of an airplane, in level cruising flight, will remain the same until one of these forces changes. Lift exactly balances weight and thrust exactly balances drag. The airplane is in "steady state" flight when all the forces are in equilibrium.

If any of the forces become greater than the force opposing it, the airplane accelerates in the direction of the applied force. For example, if thrust is increased, the airplane would continue to accelerate forward until drag increases to balance it. The airplane would then continue in steady state flight at its new, higher velocity. If the weight was suddenly decreased, the airplane would accelerate upward to a higher altitude. This would continue until the lift was reduced to the same amount of force as the weight.

An airplane is controlled and maneuvered in flight by changing altitude and thrust. To relate this concept to the four forces, every change in altitude, thrust, or both, changes lift and drag.

The flight controls in the model airplane are linked to the control surface of the airplane by cables and pulleys or by push-pull rods. Control systems are carefully designed to provide the airborne pilot or ground based transmitter operator with a feeling so that he can give the airplane just the right amount of responsiveness to the various control pressures.

The primary control systems of the model airplane (aileron, rudder and elevator) are essential to the control of the aircraft in the air. The secondary control systems (elevator trim and wing flaps) enables the pilot to trim out control system pressures and to change the lift characteristics of the wing. These systems are made up of cables, pulleys and linkages that connect the controls in the cockpit to the various movable control surfaces.

In accordance with the claimed invention, the extension apparatus 11 is provided for enabling the operator of model airplanes to operate his airplane in substantially the same manner as a pilot in an airborne airplane. As shown in FIG. 1, the extension apparatus 11 is developed to provide a means for operating transmitter 12 in a manner emulating the cockpit actions of an airborne pilot. The extension apparatus 11 comprises extension arms for the sticks 31 and 32 of the transmitter by means of a common control stick 35 and the rudder and associated stabilizers 16–18 through foot controls 36 and 37.

The extension apparatus may comprise a platform 40, preferably rectangular in shape, having mounted at one end thereof a seat 41 and having foot controls 36 and 37 mounted at the other end within reach of and operable by the feet of an operator seated on seat 41. The transmitter 12 is mounted on platform 40 between seat 41 and foot controls 37 and 38 and between the legs of an operator when seated on chair 41.

As further noted from FIG. 1, the transmitter is mounted on a base 42 which is secured to the top of platform 40 between foot controls 36 and 37 and chair 41 and between the space occupied by the operator's legs. Juxtapositioned to the transmitter 12 and between it and chair 41 on base 42 is mounted control stick 35. This control stick pivotally mounted at one end for lateral movement about this point in any direction is maintained in an inactive substantially vertical arrangement for four coil springs 43. These coil springs are attached at a common end to rungs 44 equally spaced in a line around the periphery of the control stick 35 and at their other common ends, one to each corner of a square collar 45 through which control stick 35 extends in the manner shown.

At a point between the ends of control stick 35 is mounted a flange 46 slotted at 47 to receive between its legs 48 and 49 one end of an extension arm 50 which is pivotally secured therein by a pin 51 extending through arm 50 with its end secured to legs 48 and 49. The other end of arm 50 is pivotally connected between the legs 52 and 53 of a U-shaped clamp 54 attached to one end of a cylindrical collar 55 which has an opening 58 extending inwardly of its other end for receiving the free end of stick 32 of transmitter 12, as more clearly shown in FIGS. 5 and 6. Thus, as control stick 35 is moved laterally in any quadrant of a circle about its pivot point, a similar movement is transmitted to stick 32 of transmitter 12.

The throttle of the model airplane 13 is controlled by a throttle lever 57, shown in FIG. 1, which is pivotally mounted on a rack 58 secured to the left side 41A of platform 40. Pivotal movement of throttle lever 57 causes relative movement of a cable 59 secured at one end thereto and at the other end to a clamp 60 which is secured to the free end of stick 31 of transmitter 12.

The free end of stick 31 is captured within the outline of a frame 61 extending longitudinally of platform 40. Frame 61 comprises a pair of spaced rods 62, 63, the ends of which are secured in spaced arrangement in blocks 64 and 65. Blocks 64 and 65 are slidably mounted on rods 66 and 67, the ends of which are fixedly secured in legs 68 and 69 of the U-shaped rack 70 fixedly mounted on platform 40 and arranged to extend over the top of transmitter 12, as more clearly shown in FIG. 4.

Thus, as rod 59 is moved by throttle lever 57, the free end of stick 31 is caused to move longitudinally of platform 40 within the frame 61 formed by rods 62, 63 and blocks 64, 65.

Movement of frame 61 laterally of platform 40 within the space formed between legs 68 and 69 of rack 70 occurs through the action of foot controls 36 and 37. These controls comprise a pair of spaced pivotally mounted foot pressure pads 71 and 72, each pivotally connected at the back thereof to crank arms 73 and 74, respectively. Each crank arm comprises a pair of links 75 and 76 with links 75 pivotally connected at one end to extensions 77 secured to the back surfaces of foot pressure pads 71 and 72 and each pivotally connected at their other ends to one end of links 76. The other ends of links 76 are fixedly connected to a rotatable rod 78, the ends of which are journaled in legs 79 and 80 of a U-shaped rack 81 fastened to the top surface of the end of platform 40 opposite to seat 41.

It should be noted from FIG. 7 that shaft 78 is biased to the neutral position shown by a pair of springs 82, 83 which are each connected at one end thereof to the top of rack 81 and at their other ends to different ends of a lever 84 which is fixedly connected to shaft 78 in the manner shown. The neutral position shown results in foot pads 71 and 72 normally assuming the shown angular relationship with the top of platform 40.

As shown in FIGS. 4 and 7, frame 61 is connected to shaft 78 by a suitable coupling, such as cable 85. Actuation of cable 85 causes movement of frame 61 laterally of the longitudinal axis of platform 40. As illustrated, one end of cable 85 is connected to rod 63 and the other end is connected to a clamp 86 which is secured to shaft 78. Upon movement of foot pads 71 and 72, shaft 78 is rotated, which in turn through the function of cable 85 moves frame 61 in and turns stick 31 laterally of the longitudinal axis of platform 40.

OPERATION OF TRANSMITTER

In order to achieve the benefits of flying a model airplane, it should be done in a manner that emulates the pilot's functions on board an aircraft.

Accordingly, transmitter 12 is mounted on an elongated platform 40 with a seat at one end for seating the operator and foot controls 36 and 37 at the other end of the platform in position to receive the soles of the shoes of the operator. In between the legs of the operator is mounted the transmitter on which is mounted the extension apparatus 11 for use in operating the transmitter.

As well known in the art, sticks 31 and 32 of transmitter 12 when moved skillfully can be used to control the takeoff, flight and landing of a model airplane. These controls can be operated in a more effective manner by the use of the control stick 35 mounted between the legs of the operator. This control stick is used in lieu of the wheel, shown in FIG. 15 as used on board the larger aircraft.

In takeoff, the operator uses the throttle lever 57 to control stick 31 of transmitter 12 and in turn engine speed of the model airplane 13 by cable 59 in the manner heretofore described. Control stick 35 controls the left and right elevators 19 and 20 of the aircraft. By pulling the control stick 35 toward the operator, the elevators cause the airplane to nose up and by pushing the control stick away from the operator, the elevators are manipulated to cause the airplane to nose down. Lateral movements of the control stick to the left and right controls the movement of aileron 25 and 26 in a known manner.

Rudder control is effected by lateral movement of stick 31 of transmitter 12 through the use of foot controls 36 and 37 which by means of cable 85 moves frame 61 laterally of the longitudinal axis of platform 40 to obtain movement of stick 31 to the left and right of the operator.

As well known, the rudder is the primary control for yaw and is used along with the ailerons in entering a turn to overcome the ailerons' drag that produces adverse yaw.

Thus, it is noted from the description of the claimed extension apparatus that the known transmitter for communicating with a receiver on board a model airplane can be made to emulate the control functions of a pilot on board an aircraft.

FIGS. 8-10 disclose a further modification of the extension apparatus shown in FIGS. 1-7 wherein a stick 90 of the extension apparatus 91 directly drives the control sticks 31 and 32 of transmitter 12 through cables 92 and 93 in place of the mechanisms 51-55 shown in FIG. 5. Cable 92 drives the control stick 32 in its movement laterally of platform 40 while cable 93 mechanically operates control stick 31 in a direction longitudinally of platform 40. Pads 71 and 72 of foot controls 31 and 32 are maintained in their normal positions by a pair of spaced parallelly arranged bars 94 and 95 pivotally connected at one end to platform 40 or to a bracket 98 mounted thereon with one on each side of a bar 96 which bridges the back of pads 71 and 72 in a manner similar to springs 82, 83 and bar 84 of FIG. 7. A spring 96 extends between the free ends of bars 94 and 95. A connecting link or bar 97 is pivotally mounted on bracket 98 approximately midway between its ends, which ends are pivotally connected to the back of pads 71 and 72. Thus, foot controls 36 and 37 may be operated independently of each other with both foot controls returning to their normal position when foot pressure is removed therefrom.

Figure 13:
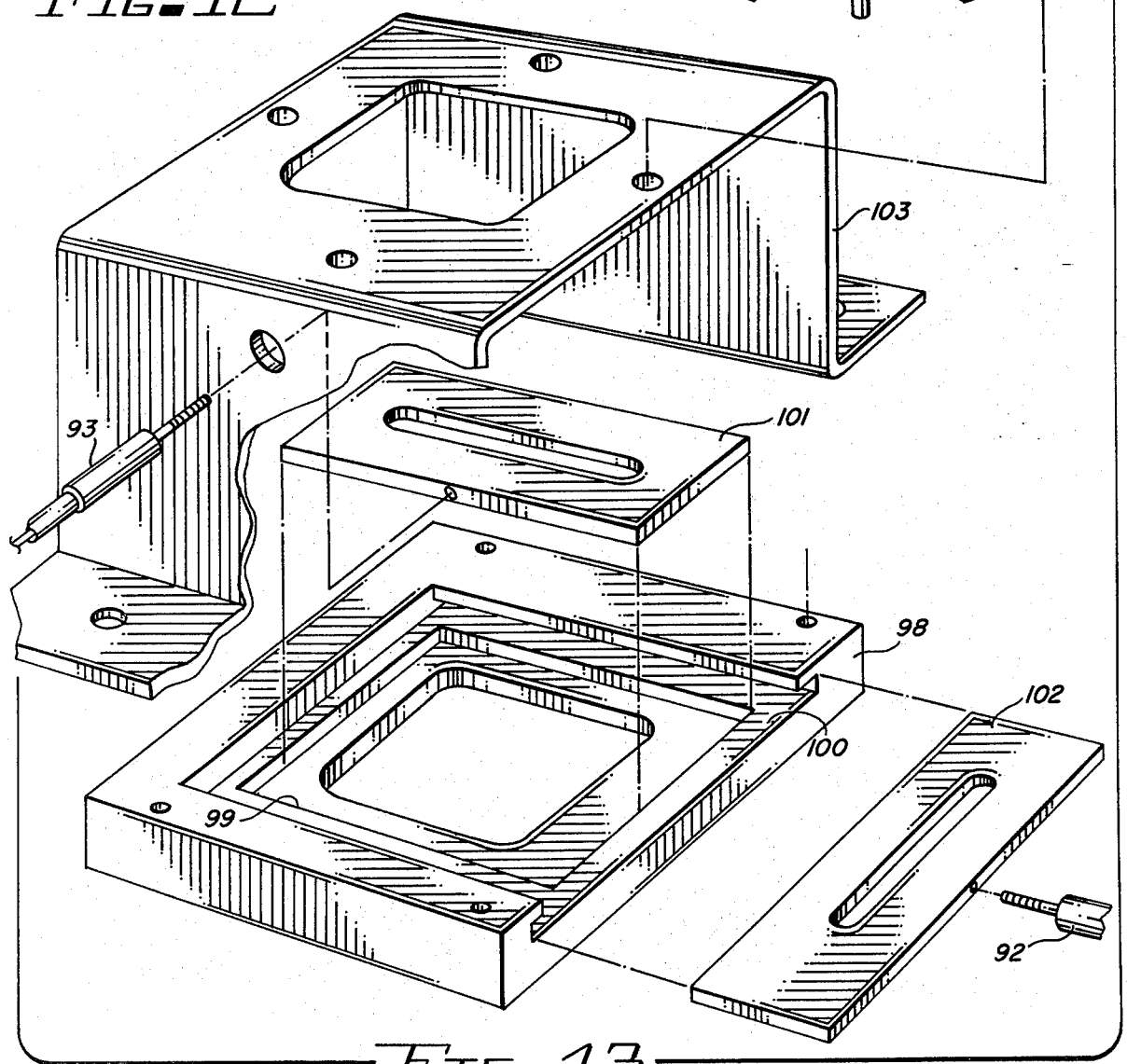
FIG. 13 is an exploded view of the control stick mechanism shown in FIGS. 8, 11 and 12.

FIGS. 11-13 illustrate the structure for pivotally mounting the control stick 90 shown in FIGS. 8-10. This structure comprises a base 98 having a slotted indentation 99 in the top of its bottom surface 100 for receiving slide plate 101. Slide plate 102 is mounted above slide plate 101 in the indentation 99 for movement laterally of slide plate 101, the movement of both being controlled by cables 92 and 93, as shown in FIG. 13, and previously described. A bracket or cover 103 encases the slide plate assembly.

The control stick 90 comprise a rod 104 which extends through the slots in slide plates 101 and 102 in a lost motion arrangement with a handle 105 protruding outwardly of the cover 103. The control stick 90 is maintained in association with the slide plates by a coil spring 106 arranged around handle 104 with one end secured to the handle and the other end secured to the top of a cover plate 107 which is bolted to cover 103 in the manner shown in FIGS. 12 and 13.

Figure 14:
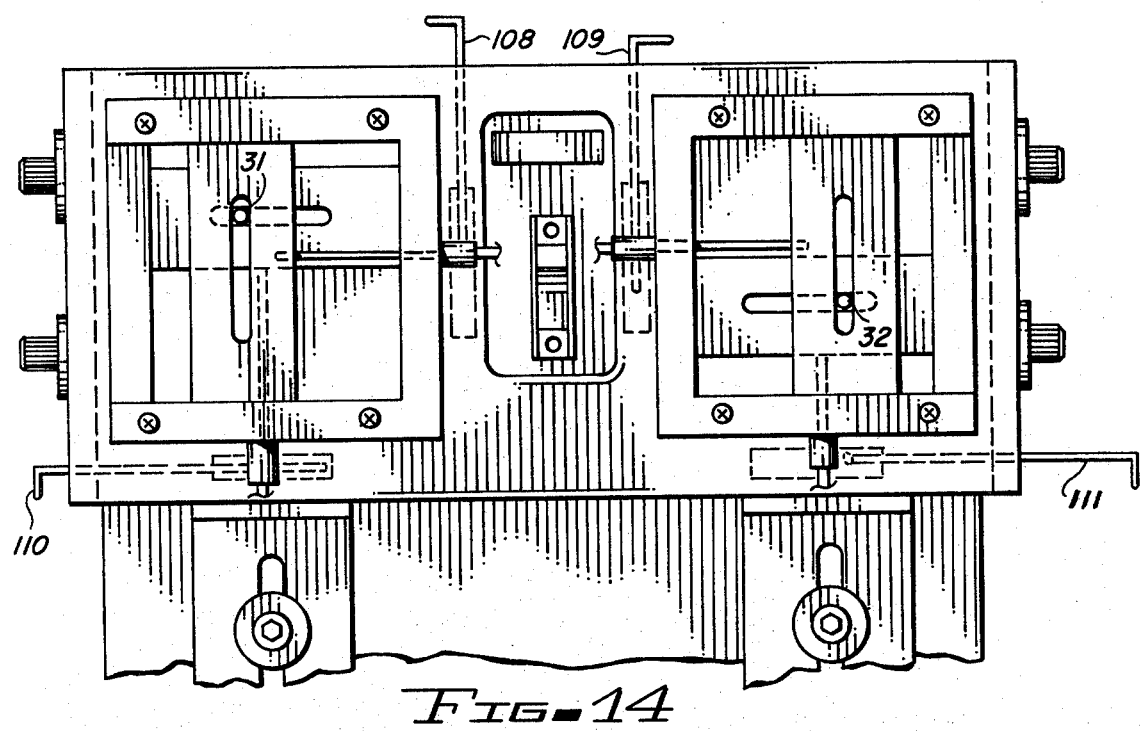
FIG. 14 is an enlarged partial view of the transmitter control shown in FIG. 8.

FIG. 14 is a partial view of the transmitter 12 of FIG. 11 showing trim rods 108 and 109 which are used for obtaining fine adjustments of control sticks 31 and 32 in movements laterally of the longitudinal axis of platform 40 and trim rods 110 and 111 which are used to obtain fine adjustments of the longitudinal movement of control stick 31 and 32.

Figure 15:
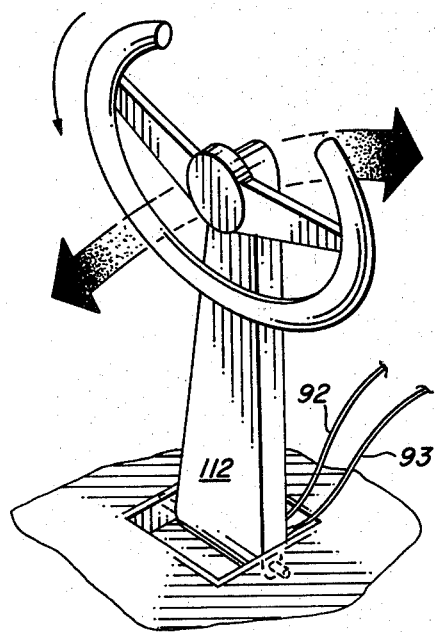
FIG. 15 is a perspective view of a wheel control utilized in place of the control stick shown in FIGS. 1 and 8.

FIG. 15 is a perspective view of a wheel assembly 112 which may be used in place of the control sticks 35 and 90 for controlling the operation of the aircraft.

Figure 16:
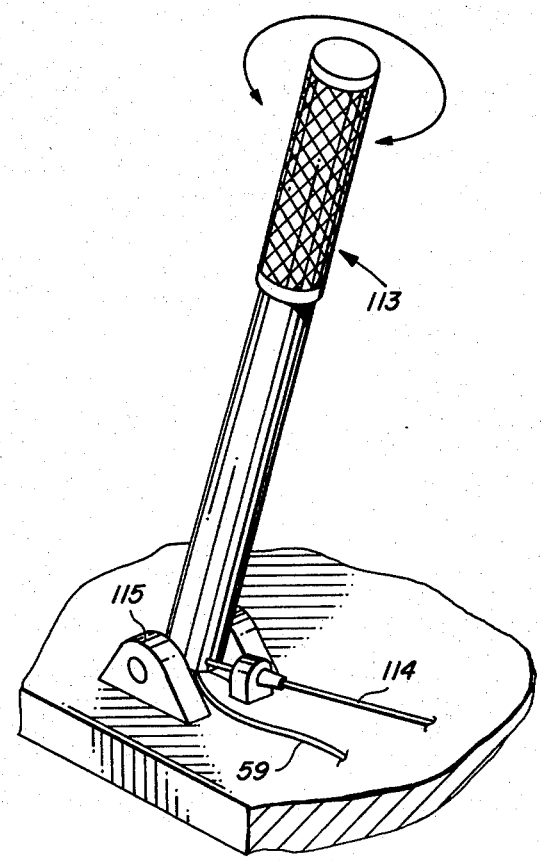
FIG. 16 is a perspective view of a modification of the throttle control means shown in FIG. 1.

FIG. 16 is a perspective view of an alternate throttle lever assembly 113 operable in the manner of a motorcycle handle for controlling the speed of the engine of the aircraft.

Although but a few embodiments of the invention have been illustrated and described, it will be apparent to those skilled in the art that various changes and modifications may be made therein without departing from the spirit of the invention or from the scope of the appended claims.

What is claimed is:

1. Apparatus for actuating pivotally mounted control members of a transmitter used for transmitting radio signals to a receiver on board a model aircraft comprising:

an elongated platform for positioning on a supporting surface, a seat mounted at one end of said platform for seating an operator, a pair of foot controls mounted at the other end of said platform on a common surface thereof in reach of the feet of the operator seated on said seat for independent movement thereof, hand operated control means mounted on said platform between said seat and said foot controls within reach of the operator when seated on said seat, said control means being pivotally biased to a neutral position, a first means for mounting a transmitter having two pivotally mounted control members, the radial movement of which causes a plurality of different radio signals to be transmitted for receipt by a receiver mounted in a model aircraft for actuating various parts thereof, a second means for transmitting a force corresponding to the independent movement of each of said foot controls to one of the control members of the transmitter, and a third means for transmitting a force corresponding to the movement of said control means to the other of the control members of the transmitter, said third means comprising a linkage mechanically interconnecting said hand control means with the other of the control members, said linkage being pivotally connected to said control means at one end thereof and telescopically engaging the other of the control members at the other end thereof, said hand operated control means comprising a shaft mounted on a base member for radial movement, said base member comprising a pair of slide plates slidably mounted therein for movement in directions transversely of each other, and said radial movement causing components of force to be applied to said plates, the movement of which is used to actuate said control members.

2. The apparatus set forth in claim 1 wherein:

said control means is biased by spring means juxtapositioned to said base.

3. The apparatus set forth in claim 1 wherein:

said control means is biased by a coil spring surrounding said shaft, one end of said coil spring being fixedly attached to said shaft and the other end of said coil spring being fixedly attached to said base.

4. The apparatus set forth in claim 1 wherein:

said control means is biased by a plurality of springs spacedly mounted around said base with one common end of each spring being attached to said base and the other common end of each of said springs being attached to points spaced from each other around said shaft.

* * * * *